US008792117B2

(12) United States Patent
Tanaka (10) Patent No.: US 8,792,117 B2
(45) Date of Patent: Jul. 29, 2014

(54) INFORMATION PROCESSING DEVICE, INFORMATION PROCESSING SYSTEM, INFORMATION PROCESSING METHOD AND COMPUTER READABLE MEDIUM STORING PROGRAM

(75) Inventor: Tatsuyuki Tanaka, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1182 days.

(21) Appl. No.: 12/204,197

(22) Filed: Sep. 4, 2008

(65) Prior Publication Data

US 2009/0244599 A1 Oct. 1, 2009

(30) Foreign Application Priority Data

Mar. 25, 2008 (JP) ................................. 2008-077039

(51) Int. Cl.
*G06F 3/12* (2006.01)

(52) U.S. Cl.
USPC ........ 358/1.15; 358/1.14; 358/1.16; 358/501; 358/401; 709/208; 709/217; 709/218; 709/225; 709/238

(58) Field of Classification Search
CPC ..................... H04L 29/08108; H04L 29/06034
See application file for complete search history.

(56) References Cited

U.S. PATENT DOCUMENTS

| | | | |
|---|---|---|---|
| 6,768,726 B2 | 7/2004 | Dorenbosch et al. | |
| 7,088,244 B2 * | 8/2006 | Kimura ....................... | 340/572.1 |
| 7,088,461 B2 * | 8/2006 | Miyano ........................ | 358/1.14 |
| 7,215,437 B2 * | 5/2007 | Shima .......................... | 358/1.15 |
| 7,373,426 B2 | 5/2008 | Jinmei et al. | |
| 2002/0001100 A1 * | 1/2002 | Kawanabe ................... | 358/1.15 |
| 2003/0002077 A1 * | 1/2003 | Shima .......................... | 358/1.15 |
| 2005/0035873 A1 * | 2/2005 | Kimura ..................... | 340/825.72 |
| 2005/0128521 A1 * | 6/2005 | Takahashi ................... | 358/1.15 |
| 2005/0174603 A1 * | 8/2005 | Iinuma et al. ............... | 358/1.16 |
| 2005/0174606 A1 * | 8/2005 | Matsueda et al. ........... | 358/402 |
| 2006/0017941 A1 * | 1/2006 | Momozono et al. ........ | 358/1.1 |
| 2006/0250643 A1 * | 11/2006 | Matsumoto et al. ........ | 358/1.15 |
| 2007/0053000 A1 * | 3/2007 | Nakamura .................. | 358/1.15 |
| 2007/0073564 A1 * | 3/2007 | Mizuki et al. ................... | 705/6 |
| 2007/0179827 A1 * | 8/2007 | Gupta et al. ..................... | 705/8 |
| 2007/0206216 A1 * | 9/2007 | Sakagami et al. .......... | 358/1.15 |
| 2008/0034118 A1 | 2/2008 | Jinmei et al. | |
| 2009/0112753 A1 * | 4/2009 | Gupta et al. ................... | 705/38 |
| 2009/0244599 A1 | 10/2009 | Tanaka | |

FOREIGN PATENT DOCUMENTS

| | | | |
|---|---|---|---|
| CN | 1450478 | A | 10/2003 |
| CN | 1817007 | A | 8/2006 |
| JP | 2003-273936 | A | 9/2003 |
| JP | 2006-050137 | A | 2/2006 |

OTHER PUBLICATIONS

Japanese Office Action dated Jan. 13, 2010 for Japanese Patent Application No. 2008-077039 and English-language translation.
Chinese Office Action in counterpart Chinese patent application No. 200810186601.0 dated Oct. 11, 2012 and English language translation thereof.

* cited by examiner

*Primary Examiner* — Hilina K Demeter
(74) *Attorney, Agent, or Firm* — Sughrue Mion, PLLC (57) ABSTRACT

An information processing device includes a communication unit that communicates with a designated information processing device, and a controller that, when the communication unit attempts communication with the designated information processing device and the attempt fails, controls the communication unit so as to attempt communication with the designated information processing device by using identifying (ID) information on a transmission source used when a communication attempt with the designated information processing device has succeeded.

11 Claims, 10 Drawing Sheets

ADDRESS LIST

| DESTINATION ADDRESS | TRANSMISSION SOURCE ADDRESS |
|---|---|
| 2001:DB8::B | 2001:DB8::1111 |
| ········ | ········ |

FIG. 6A

ADDRESS LIST

| DESTINATION ADDRESS | TRANSMISSION SOURCE ADDRESS |
|---|---|
| 2001:DB8::B | 2001:DB8::2222 |
| ········ | ········ |

FIG. 6B

ADDRESS LIST

| DESTINATION ADDRESS | TRANSMISSION SOURCE ADDRESS |
|---|---|
| 2001:DB8::B | 2001:DB8::1111 |
| 2001:DB8::B | 2001:DB8::2222 |
| ········ | ········ |

ADDRESS LIST

| DESTINATION ADDRESS | TRANSMISSION SOURCE ADDRESS |
|---|---|
| 2001:DB8::B | 2001:DB8::1111 |
| ･･･････ | ･･･････ |

FIG. 8B

| DESTINATION ADDRESS | TRANSMISSION SOURCE ADDRESS |
|---|---|
| 2001:DB8::B | ::(UNSPECIFIED ADDRESS) |
| ･･･････ | ･･･････ |

FIG. 10A

ADDRESS LIST

| DESTINATION ADDRESS | TRANSMISSION SOURCE ADDRESS | RESULT OF PRE-CHECK |
|---|---|---|
| 2001:DB8::B | 2001:DB8::1111 | UNCHECKED |
| 2001:DB8::C | 2001:DB8::1111 | UNCHECKED |
| ......... | ......... | ......... |

FIG. 10B

| DESTINATION ADDRESS | TRANSMISSION SOURCE ADDRESS | RESULT OF PRE-CHECK |
|---|---|---|
| 2001:DB8::B | ::(UNSPECIFIED ADDRESS) | CHECKED |
| 2001:DB8::C | 2001:DB8::1111 | CHECKED |
| ......... | ......... | ......... |

INFORMATION PROCESSING DEVICE, INFORMATION PROCESSING SYSTEM, INFORMATION PROCESSING METHOD AND COMPUTER READABLE MEDIUM STORING PROGRAM

CROSS-REFERENCE TO RELATED APPLICATIONS

This application is based on and claims priority under 35 USC 119 from Japanese Patent Application No. 2008-077039 filed Mar. 25, 2008.

BACKGROUND

Technical Field

The present invention relates to an information processing device, an information processing system, an information processing method and a computer readable medium storing a program.

SUMMARY

According to an aspect of the present invention, there is provided an information processing device including a communication unit that communicates with a designated information processing device, and
a controller that, when the communication unit attempts communication with the designated information processing device and the attempt fails, controls the communication unit so as to attempt communication with the designated information processing device by using identifying (ID) information on a transmission source used when a communication attempt with the designated information processing device has succeeded.

DETAILED DESCRIPTION

[Background]

First, to facilitate understanding of the present invention, its background and outline will be described.

In Internet Protocol version 6 (IPv6) which is the next generation Internet Protocol, a temporary address function is used. This temporary address function is a function which, for enhancing anonymity, changes address information on the transmission source, for instance with regular periodicity, by varying, at random, part of the address to be used as the address information on the transmission source.

As touched upon above, in an information processing device which communicates with another device, access restriction (communication restriction) may be imposed to meet security requirements by setting only the addresses of specific transmission sources as authorized addresses in advance and accepting communication attempts from such authorized addresses.

For this reason, if electronic mail or various data is to be transmitted from an information processing device using a temporary address function to another information processing device imposing such access restriction, since the transmission source address used by the transmitting information processing device varies successively, the information processing device on the receiving side refuses access, resulting in communication failure.

Exemplary Embodiments

Next, exemplary embodiments of the present invention will be described in detail with reference to drawings. The following description of these exemplary embodiments will concern an image forming system in which an image forming device functions as the transmitting information processing device and a terminal device such as a personal computer functions as the receiving information processing device.

First Exemplary Embodiment

Figure 1:
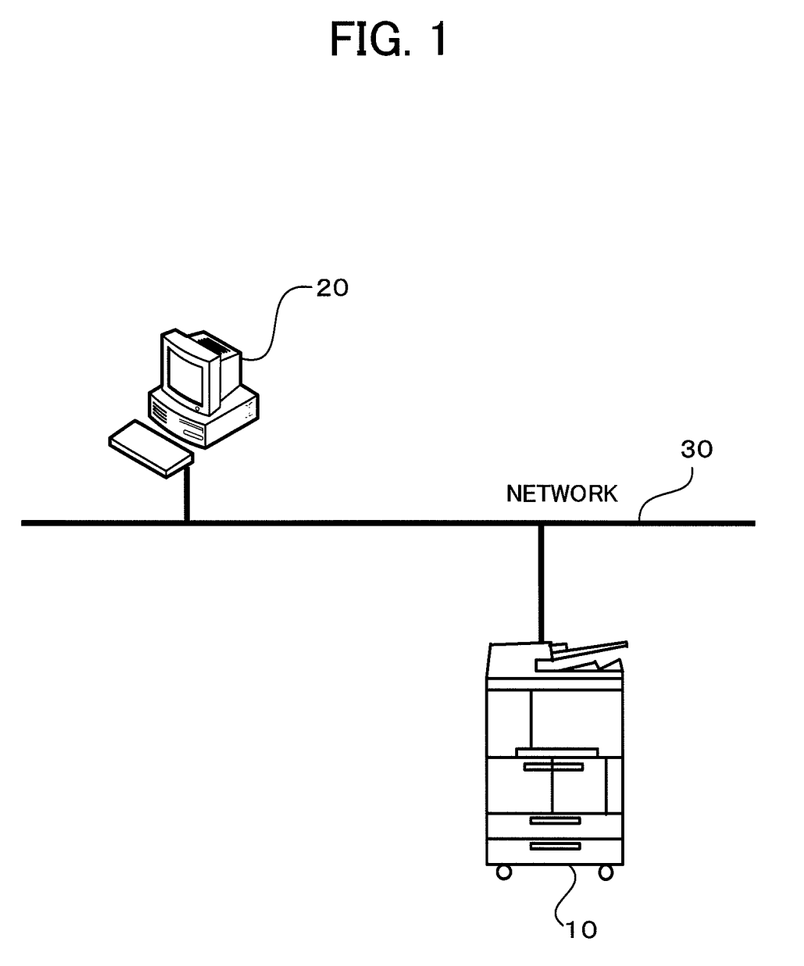
FIG. 1 shows the system configuration of an image forming system, which is a first exemplary embodiment of the present invention.

To begin with, an image forming system having an image forming device which is a first exemplary embodiment of the invention will be described. FIG. 1 shows the configuration of the image forming system of the first exemplary embodiment of the invention.

The image forming system of the first exemplary embodiment of the invention, as shown in FIG. 1, includes an image forming device 10 and a terminal device 20 connected to each other by a network 30 which is one example of a communication unit. The terminal device 20 generates print data and transmits the generated print data to the image forming device 10 via the network 30. The image forming device 10, accepting the print data transmitted from the terminal device 20, prints out an image corresponding to the print data on a paper sheet. Incidentally, the image forming device 10 here refers to, for instance, a so-called multifunction device having plural functions including the functions of printing, scanning, copying and facsimile.

Figure 2:
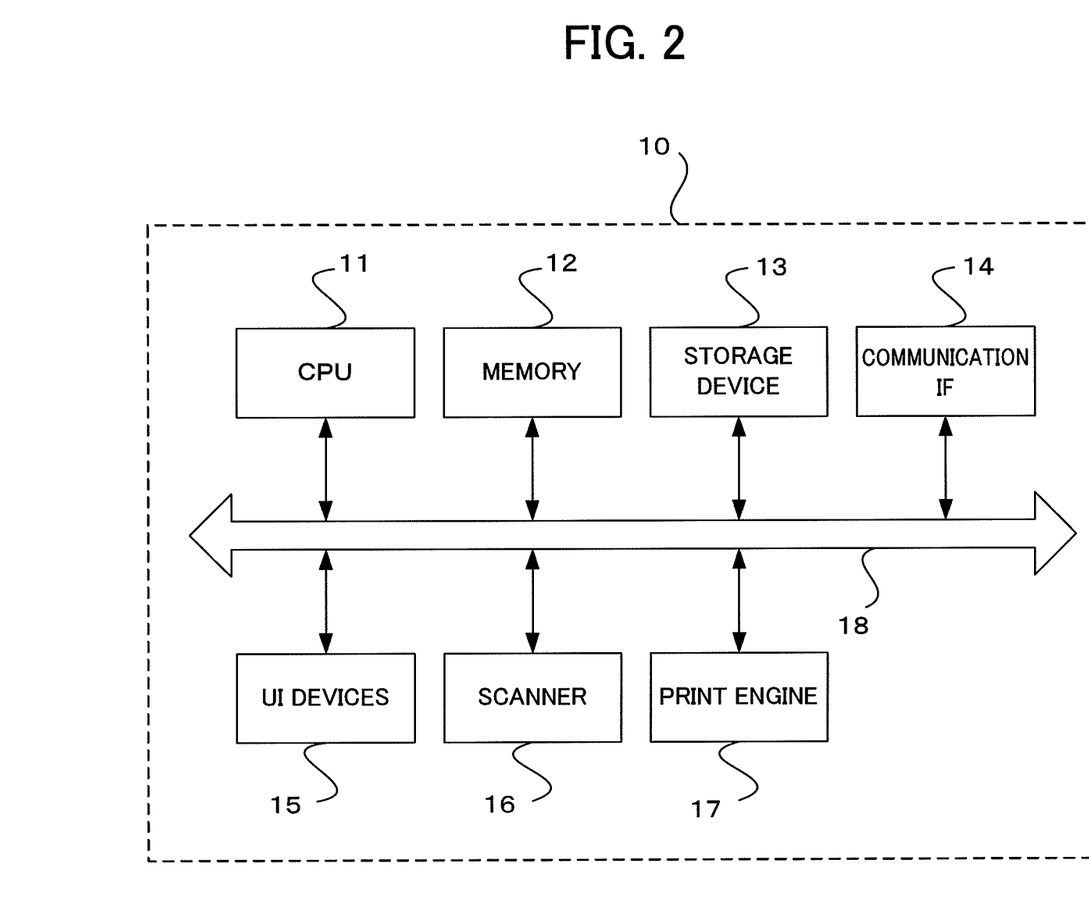
FIG. 2 is a block diagram showing the hardware configuration of an image forming device 10 in the first exemplary embodiment of the invention.

Next, the hardware configuration of the image forming device 10 in the image forming system of the first exemplary embodiment is shown in FIG. 2.

The image forming device 10, as shown in FIG. 2, includes a CPU 11, a memory 12, a storage device 13 such as a hard disk drive (HDD), a communication interface (IF) 14 which transmits and receives data to and from an external device or the like via the network 30, user interface (UI) devices 15 which include a touch panel or a liquid crystal display and a keyboard, a scanner 16 and a print engine 17. These constituent elements are connected to one another by a control bus 18.

The CPU 11 controls the operation of the image forming device 10 by attempting prescribed processing in accordance with a control program stored in the memory 12 or the storage device 13.

Incidentally, though it is described above that the CPU 11 in this exemplary embodiment reads and attempts a control program stored in the memory 12 or the storage device 13, it is also possible to store the program in a storage medium such as a CD-ROM and provide it to the CPU 11.

Figure 3:
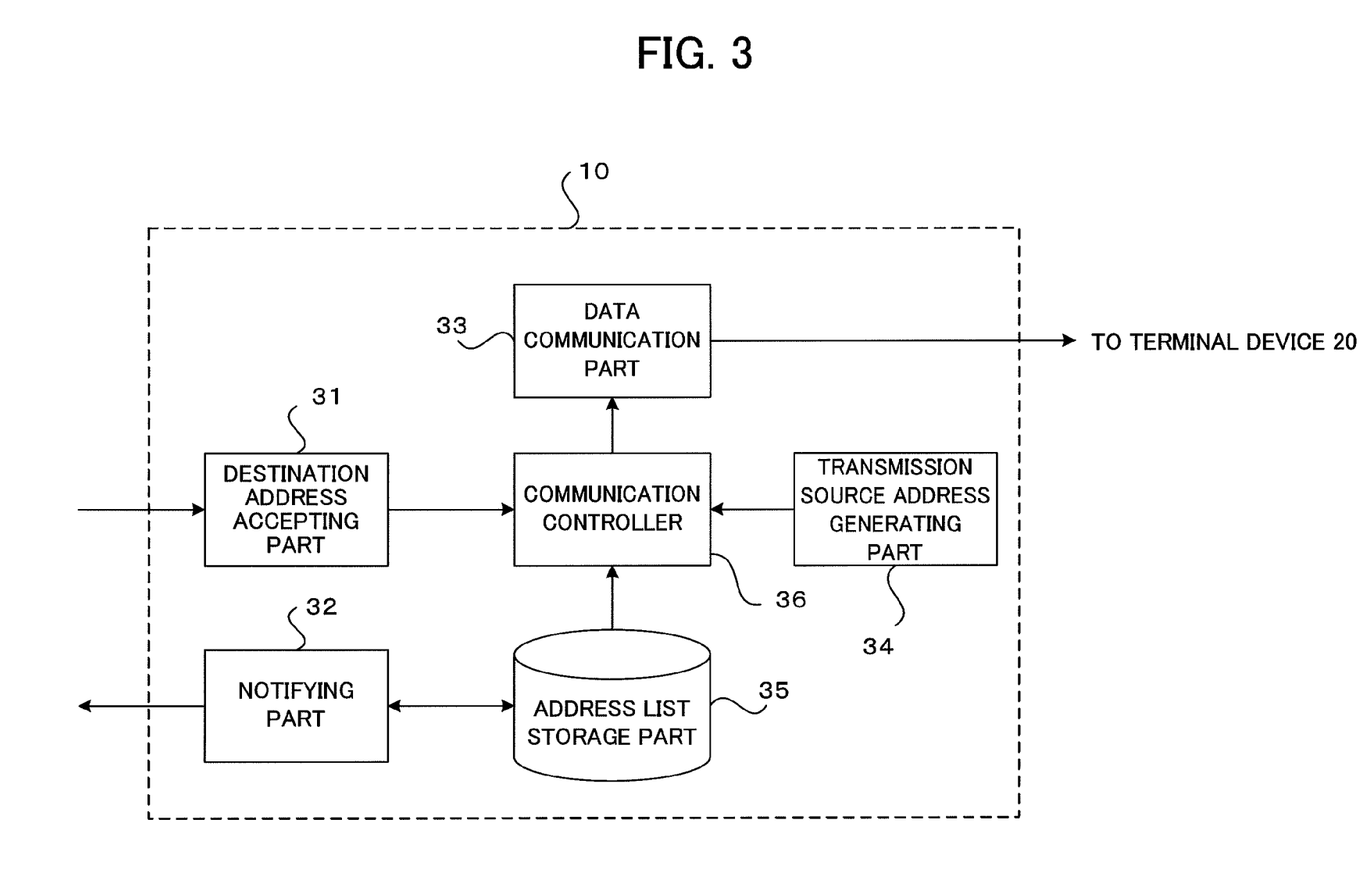
FIG. 3 is a block diagram showing the functional configuration of the image forming device 10 in the first exemplary embodiment of the invention.

FIG. 3 is a block diagram showing the functional configuration of the image forming device 10 realized by the execution of the control program.

The image forming device 10 of this exemplary embodiment, as shown in FIG. 3, is provided with a destination address accepting part 31, a notifying part 32, a data communication part 33, a transmission source address generating part 34, an address list storage part 35 and a communication controller 36.

The destination address accepting part 31 accepts, from the user, a destination address (ID information on the addressee or ID information on the destination) for designating the destination device of image data and various other data.

The communication controller 36 controls the data communication part 33 so as to transmit data to a destination device designated by the destination address accepted by the destination address accepting part 31.

The transmission source address generating part 34 generates a transmission source address (ID information on the transmission source), which periodically varies at regular time intervals, and transfers it to the communication controller 36 to realize a temporary address function. Thus, the transmission source address is altered by the transmission source address generating part 34 at regular time intervals.

The data communication part 33, by using the transmission source address transferred from the transmission source address generating part 34, transmits various data by performing communication with a destination device designated by the destination address accepted by the destination address accepting part 31 under the control of the communication controller 36.

The address list storage part 35, if it succeeds in connecting communication with the information processing device designated by the data communication part 33, relates the transmission source address used at the time of successful connection of communication to the destination address of the information processing device and stores it into an address list.

The communication controller 36, if it fails to connect communication with the information processing device designated by the data communication part 33 by using the transmission source address generated by the transmission source address generating part 34, controls the data communication part 33 so as to execute again the attempt to communicate with the designated information processing device in accordance with the transmission source address stored in the address list storage part 35 related to the destination address of the designated information processing device.

Thus, the communication controller 36, if it fails to connect communication with the information processing device designated by the data communication part 33, controls the data communication part 33 so as to attempt communication with the designated information processing device by using the transmission source address which has been used in successful communication with the designated information processing device.

If the number of pairs of transmission source addresses and destination addresses stored in the address list storage part 35 exceeds a preset level, the notifying part 32 notifies the user of that excess.

Figure 4:
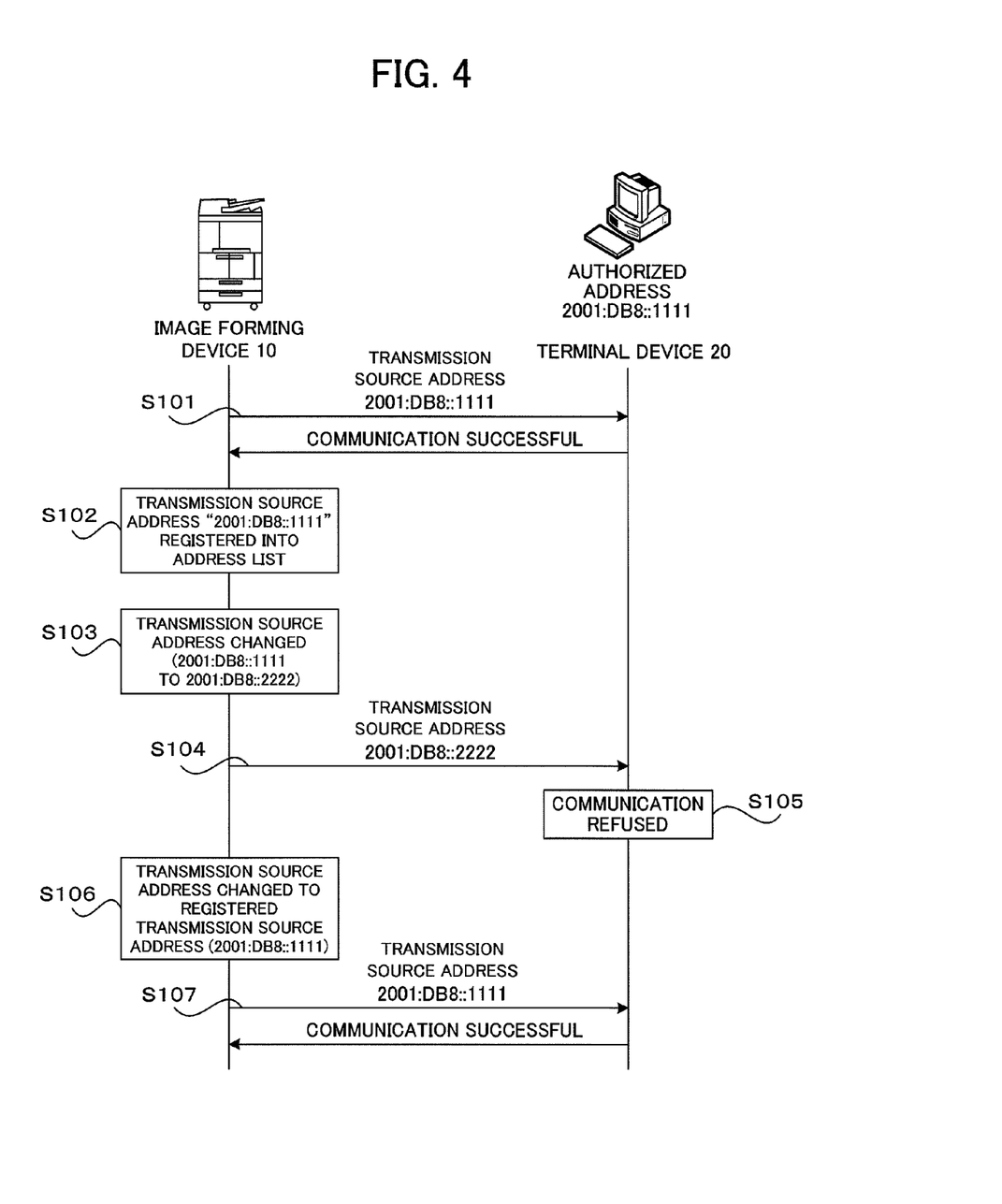
FIG. 4 is a sequence chart showing the procedure of communication accomplished between the image forming device 10 and a terminal device 20 in the first exemplary embodiment of the invention.

Next, the procedure of communication to take place between the image forming device 10 and the terminal device 20 in this exemplary embodiment will be described with reference to the sequence chart of FIG. 4.

Here, the image forming device 10 periodically varies the transmission source address by using the temporary address function while communicating with the terminal device 20. In the terminal device 20, specific transmission source addresses are set as authorized addresses, and the terminal device 20, if the transmission source address of the communication from the image forming device 10 is an authorized address, performs access restriction (communication restriction) exempting this communication. In the following description, it is supposed that an address "2001:DB8::1111" is preset as an authorized address in the terminal device 20. It is also supposed that the address of the terminal device 20 is "2001:DB8::B".

First, the image forming device 10 attempts communication with the terminal device 20 by using the address "2001:DB8::1111" as the transmission source address (step S101). Then, the communication proves successful as the transmission source address "2001:DB8::1111" is set as an authorized address at the terminal device 20, and a message is returned from the terminal device 20 to the image forming device 10 to the effect that the communication has been successfully connected.

Figure 5:
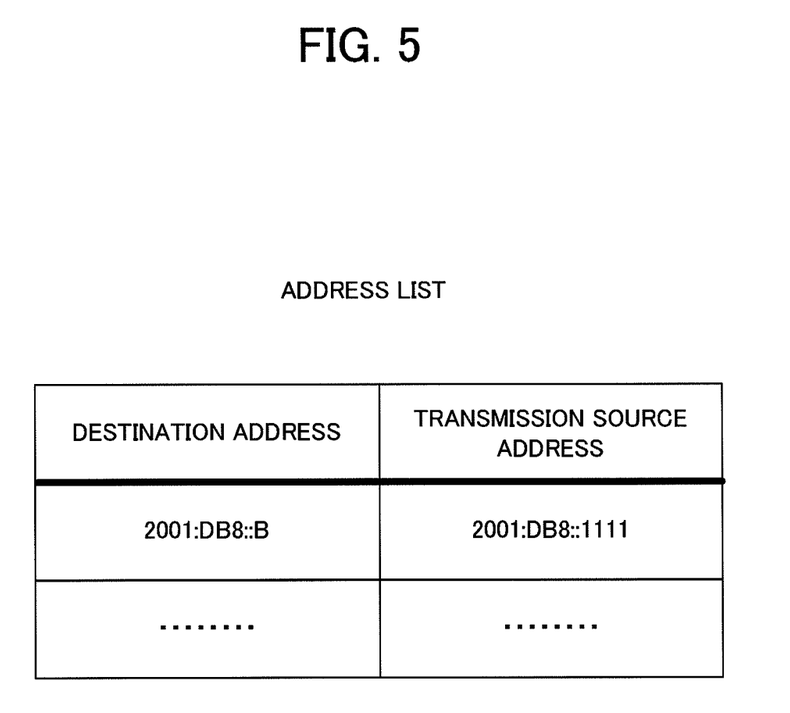
FIG. 5 shows a specific example of an address list of the image forming device 10 in the first exemplary embodiment of the invention.

Then, the communication controller 36 of the image forming device 10, as shown in FIG. 5, causes the transmission source address "2001:DB8::1111" at the time of successful connection of communication to be stored into the address list storage part 35 in a match with the address "2001:DB8::B" of the terminal device 20 (step S102).

After the lapse of a certain length of time, when the transmission source address generating part 34 generates a new address "2001:DB8::2222" (step S103) and the image forming device 10 attempts communication with the terminal device 20 with this address as the transmission source address (step S104), the terminal device 20 rejects this communication attempt because the transmission source address is not an authorized address (step S105).

Then, the image forming device 10 determines that the communication attempt has been rejected by the terminal device 20 because no message is returned from the terminal device 20 after the lapse of a certain length of time, searches the address list stored in the address list storage part 35 for the transmission source address "2001:DB8::1111" stored in a match with the destination address "2001:DB8::B" of the terminal device 20, and newly sets this transmission source address "2001:DB8::1111" as a transmission source address (step S106).

Then, the image forming device 10 attempts again connection of communication with the terminal device 20 with its transmission source address as "2001:DB8::1111" (step S107). As a result, the terminal device 20 accepts the communication attempt from the image forming device 10 and returns a message notifying the successful connection.

To add, though the foregoing description of this exemplary embodiment supposes that the address list storage part 35 stores, into the address list, the transmission source address used when the communication attempt is successfully connected in a match with the destination address of a designated information processing device, if another transmission source address list is already registered in a match with the destination address of the information processing device, either the transmission source address list used when the communication attempt is successfully connected may be written over the already registered other transmission source address list or the transmission source address list used when the communication attempt is successfully connected and the destination address are not matched with each other, leaving the already registered transmission source address list.

Figure 6A:
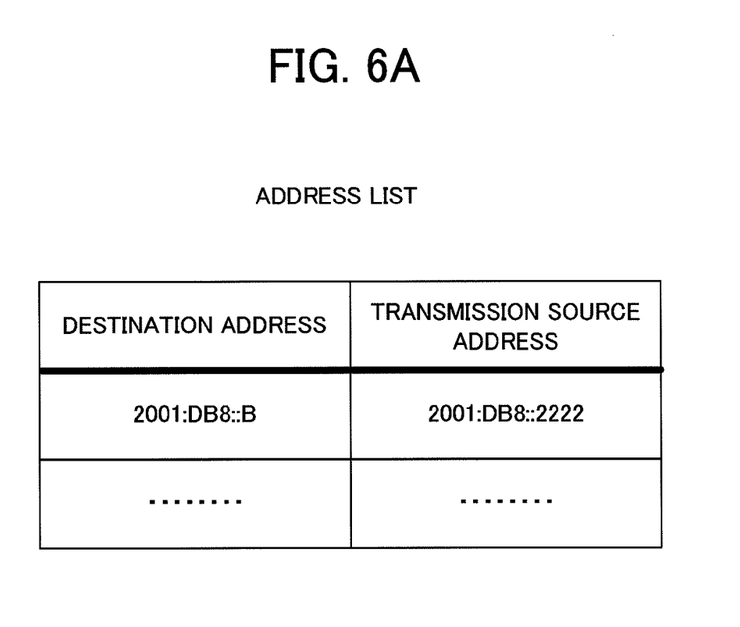
FIGS. 6A and 6B show other specific examples of the address list of the image forming device 10 in the first exemplary embodiment of the invention.

For instance, in a state in which the address list shown in FIG. 5 is already registered, if a communication attempt using the transmission source address "2001:DB8::2222" proves successful, either the transmission source address "2001:DB8::1111" registered in a match with the destination address "2001:DB8::B" as shown in FIG. 6A may be overwritten with the transmission source address "2001:DB8::2222" or the transmission source address "2001:DB8::1111" may be left as it is without registering the transmission source address "2001:DB8::2222".

Figure 6B:
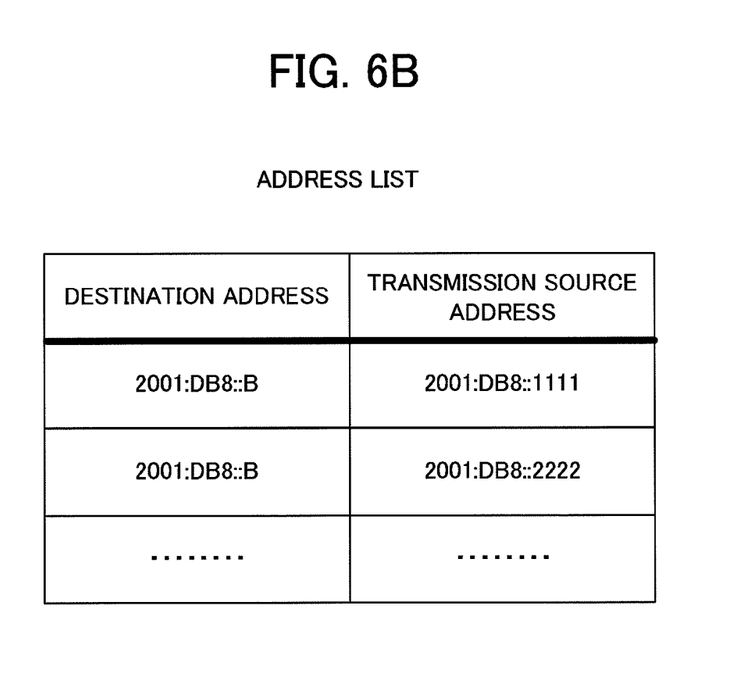

Further, if the address list storage part 35 has an unused storage capacity and a communication attempt with the designated information processing device proves successful again as shown in FIG. 6B, the transmission source addresses used in successful communication attempts may as well be registered successively.

Second Exemplary Embodiment

Next, an image forming device which is a second exemplary embodiment of the invention will be described.

The image forming device of this exemplary embodiment has a configuration in which the image forming device 10 of the first exemplary embodiment described is augmented with the following function.

The communication controller 36 in this exemplary embodiment has a function to change the transmission source address stored in the address list storage part 35 to an unspecified address when the communication attempt with the designated information processing device has proved successful, a transmission source address matching the destination address of the information processing device with which communication has been established is already stored in the address list storage part 35 and a communication attempt with the information processing device designated by a different address from this transmission source address has proved successful again.

The unspecified address here may be any information which indicates that no communication restriction is executed by the designated information processing device and means that no specific address is designated.

Then, the communication controller 36, if it fails in a communication attempt with a designated information processing device by using certain transmission source address information and if the transmission source address stored in the address list storage part 35 in a match with the destination address information of the designated information processing device is an unspecified address, controls the data communication part 33 so as not to attempt again communication with the designated information processing device.

Figure 7:
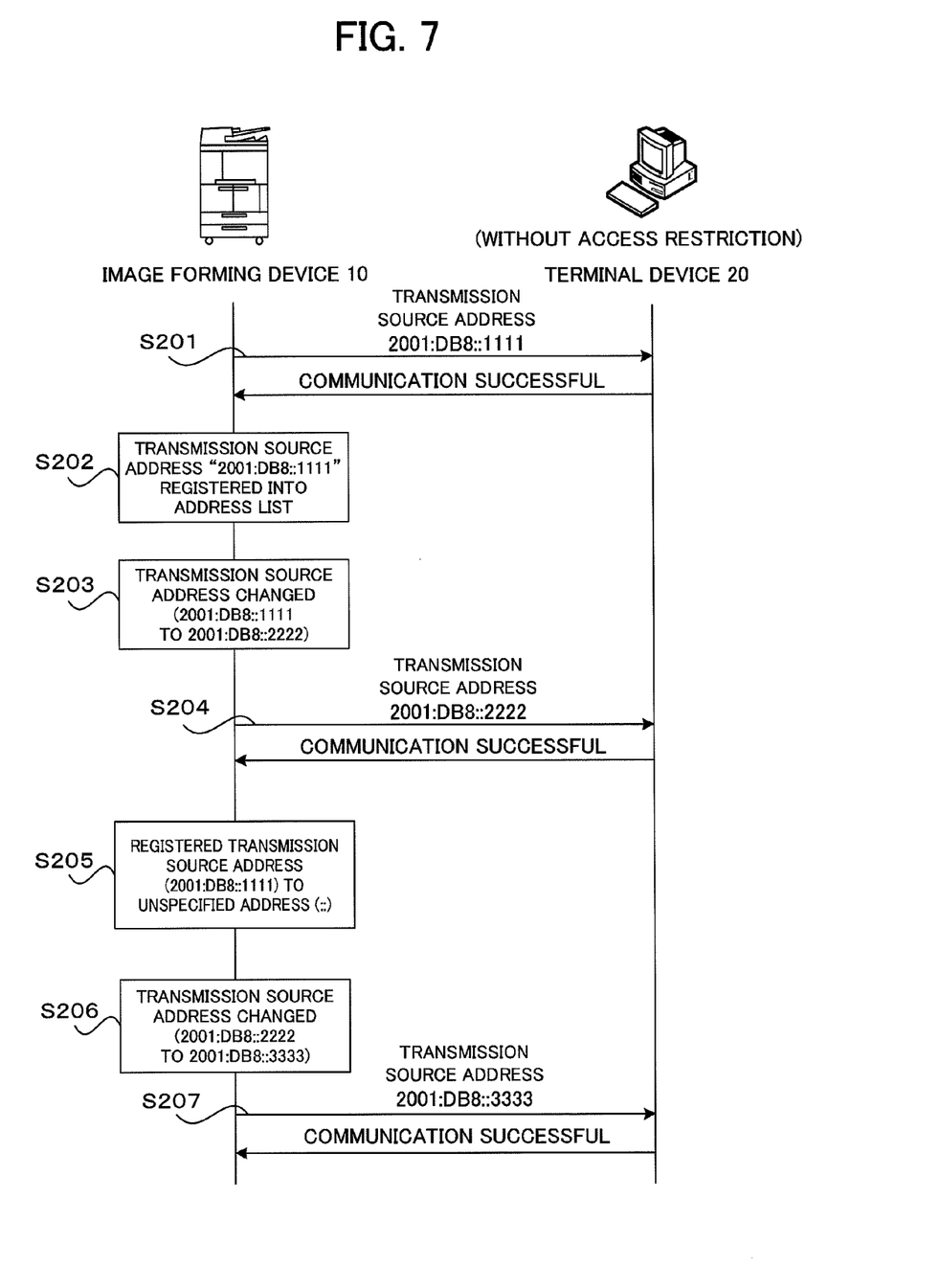
FIG. 7 is a sequence chart showing the procedure of communication accomplished between the image forming device 10 and a terminal device 20 in a second exemplary embodiment of the invention.

Next, the procedure of communication accomplished between the image forming device 10 and the terminal device 20 in this exemplary embodiment will be described with reference to the sequence chart of FIG. 7.

Here, the image forming device 10 is periodically varying the transmission source address by using the temporary address function while communicating with the terminal device 20. The terminal device 20 is supposed to perform no access control that would allow acceptance of only specific transmission sources addresses. It is also supposed that the address of the terminal device 20 is "2001:DB8::B".

First, the image forming device 10 attempts communication with the terminal device 20 by using the address "2001:DB8::1111" as the transmission source address (step S201). Then, the communication proves successful in the terminal device 20 as no access control is performed, and a message is returned from the terminal device 20 to the image forming device 10 to the effect that the communication has been successfully connected.

Figure 8A:
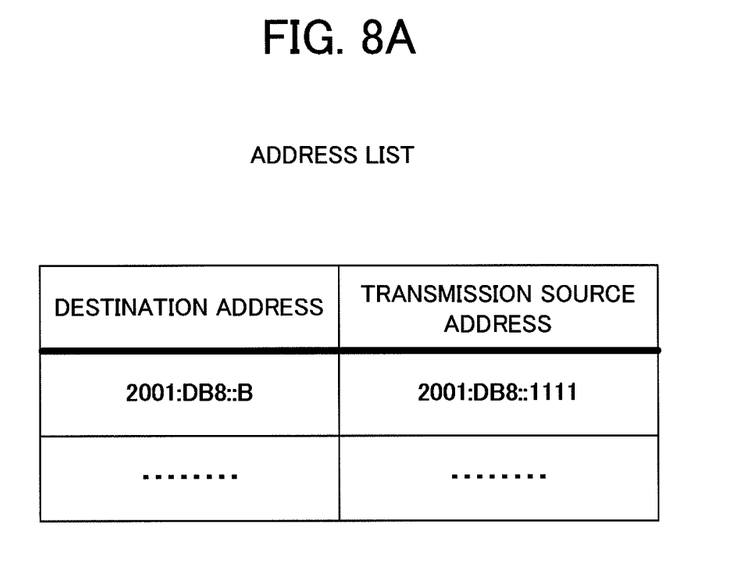
FIGS. 8A and 8B show specific examples of address list of the image forming device 10 in the second exemplary embodiment of the invention.

Then, the communication controller 36 of the image forming device 10, as shown in FIG. 8A, causes the transmission source address "2001:DB8::1111" at the time of successful connection of communication to be stored into the address list storage part 35 in a match with the address "2001:DB8::B" of the terminal device 20 (step S202).

After the lapse of a certain length of time, when the transmission source address generating part 34 generates a new address "2001:DB8::2222" (step S203) and the image forming device 10 attempts communication with the terminal device 20 with this address as the transmission source address (step S204), this communication attempt succeeds at the terminal device 20 because no access control is performed at the terminal device 20, and a message is returned from the terminal device 20 to the image forming device 10 to the effect that the communication has been successfully connected.

Figure 8B:
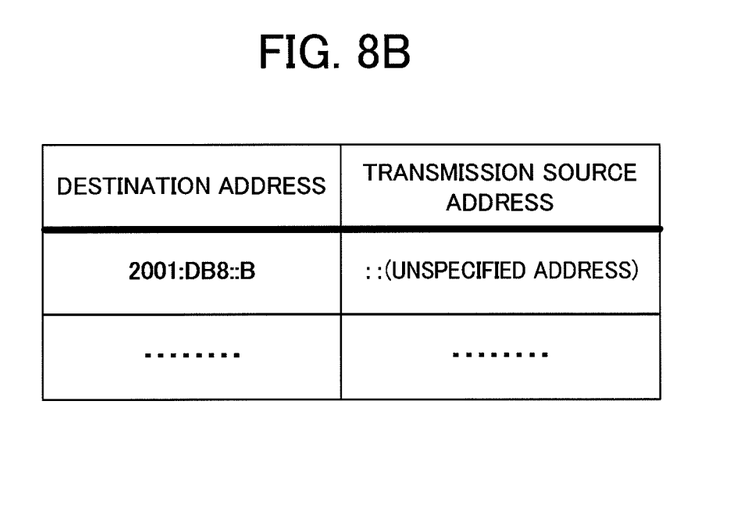

Then, the communication controller 36 of the image forming device 10 determines that no access control is performed at the terminal device 20 as shown in FIG. 8B, and changes the transmission source address "2001:DB8::1111" registered in a match with the destination address "2001:DB8::B" in the address list to an unspecified address "::" (step S205).

Then, after the lapse of a certain length of time, when the transmission source address generating part 34 generates a new address "2001:DB8::3333" (step S206) and the image forming device 10 attempts communication with the terminal device 20 with this address as the transmission source address (step S207), this communication attempt succeeds at the terminal device 20 because no access control is performed at the terminal device 20, and a message is returned from the terminal device 20 to the image forming device 10 to the effect that the communication has been successfully connected.

Third Exemplary Embodiment

Next, an image forming device which is a third exemplary embodiment of the invention will be described.

The image forming device of this exemplary embodiment has a configuration in which the image forming device 10 of the second exemplary embodiment described is augmented with the following function.

Figure 10A:
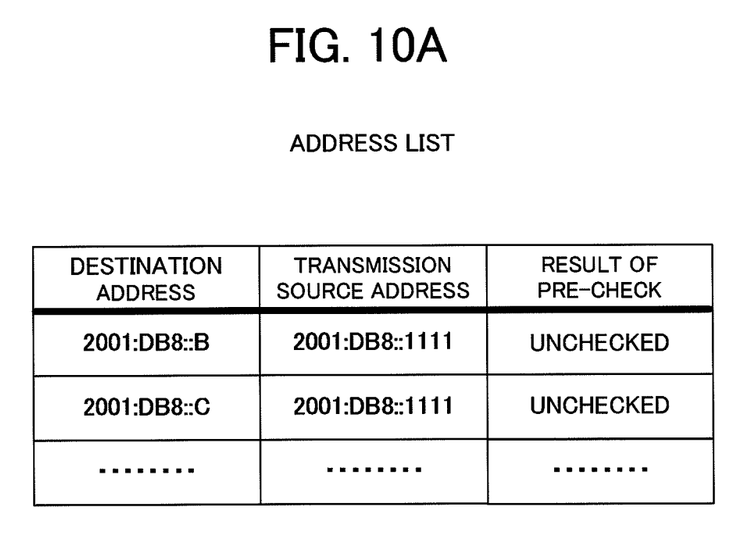
FIGS. 10A and 10B show specific examples of address list of the image forming device 10 in the third exemplary embodiment of the invention.

The address list storage part 35 in this exemplary embodiment stores decision information indicating whether or not the information processing device of the destination of transmission imposes any communication restriction into the address list in which the transmission source addresses used when communication attempts has succeeded and the destination addresses of the designated information processing devices are matched with each other. More specifically, a column "Result of pre-check" is provided in the address list, wherein information such as "Unchecked" is recorded if it has not been checked whether or not the information processing device of the destination of transmission imposes any communication restriction or information such as "Checked" is recorded if it has been checked whether or not the information processing device of the destination of transmission imposes any communication restriction.

The communication controller 36 in this exemplary embodiment changes, when the communication attempt with the designated information processing device fails and the transmission source address registered in a match with this destination address is different from the transmission source address used when communication has been successfully connected, the "Result of pre-check" entry stored in the address list storage part 35 in a match with the destination address information to "Checked".

Also, the communication controller 36 changes, when the communication attempt with the designated information processing device has proved successful, the destination address of the information processing device with which communication has been established is already stored in the address list storage part 35 and the transmission source address registered in a match with this destination address is different from the transmission source address used when communication has been successfully connected, and the transmission source address registered in a match with this destination address is different from the transmission source address used when communication is successfully connected, the transmission source address stored in the address list storage part 35 in a match with the destination address to an unspecified address and the "Result of pre-check" entry matching the transmission source address to "Checked".

Further the communication controller 36, when it is to attempt communication with a designated information processing device by using a certain transmission source address, checks the "Result of pre-check" information stored in the address list storage part 35 in a match with the destination address information of the designated information processing device, and controls the data communication part 33, if this information is "Checked" and the transmission source address is registered for the destination address, so as to attempt communication with the designated information processing device by using the registered transmission source address.

Figure 9:
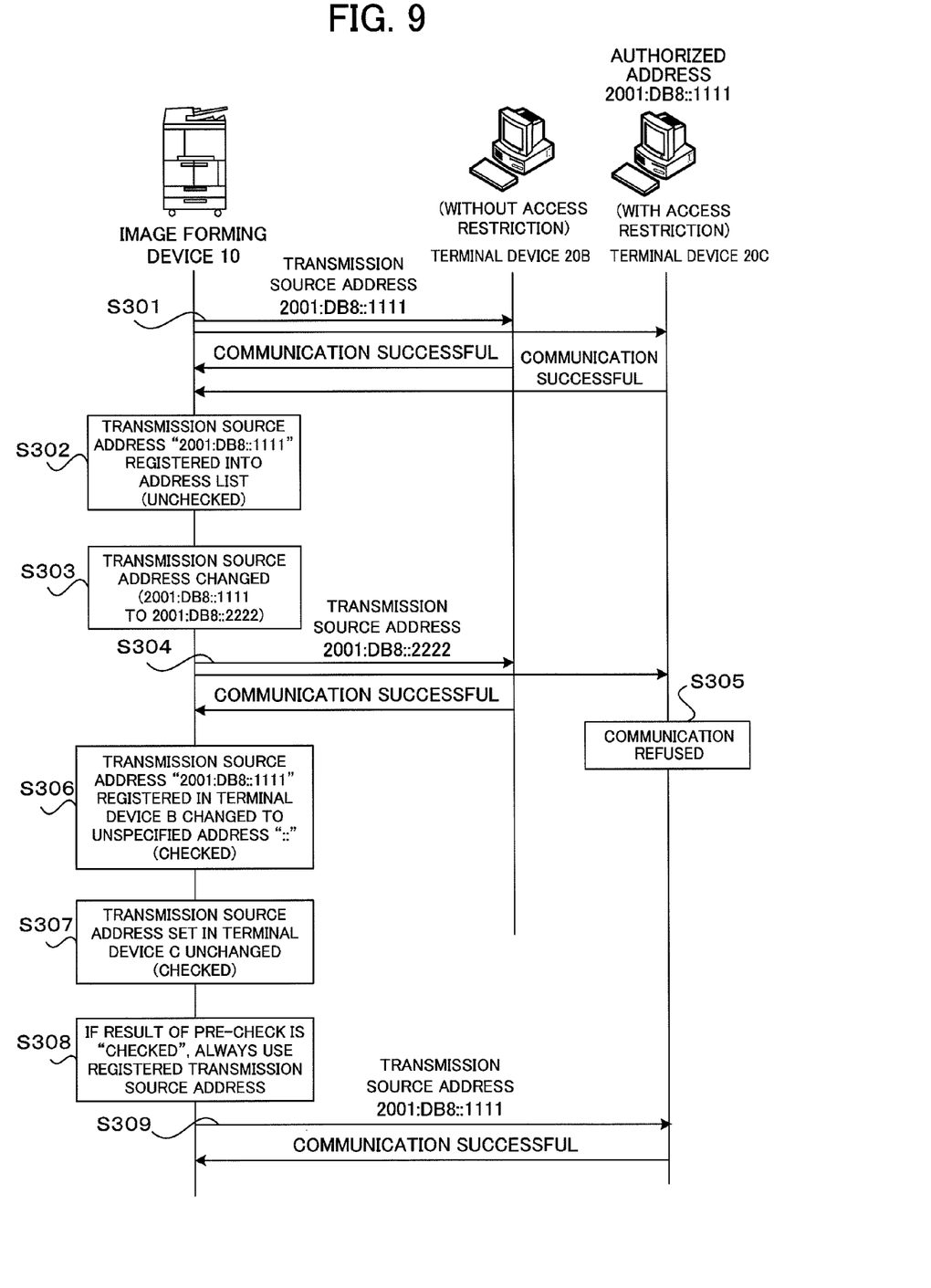
FIG. 9 is a sequence chart showing the procedure of communication accomplished between the image forming device 10 and terminal devices 20B and 20C in a third exemplary embodiment of the invention.

Next, the procedure of communication accomplished between the image forming device 10 and two terminal devices 20B and 20C in this exemplary embodiment will be described with reference to the sequence chart of FIG. 9.

Here, the image forming device 10 is periodically varying the transmission source address by using the temporary address function while performing communication between the terminal devices 20B and 20C. The terminal device 20B is supposed to perform no access control that would allow acceptance of only specific transmission sources addresses, while the terminal device 20C is supposed to be performing with "2001:DB8::B" being set as the authorized address. The address of the terminal device 20B is supposed to be "2001:DB8::B" and that of the terminal device 20C, "2001:DB8::C".

First, the image forming device 10 attempts communication with the terminal devices 20B and 20C by using the address "2001:DB8::1111" as the transmission source address (step S301). Then, the attempt succeeds with the terminal device 20B because no access restriction is imposed, and a message is returned from the terminal device 20B to the image forming device 10 to the effect that the communication has been successfully connected. Also, the attempt succeeds with the terminal device 20C because the transmission source address "2001:DB8::1111" is set as the authorized address, and a message is returned from the terminal device 20C to the image forming device 10 to the effect that the communication has been successfully connected.

Then, the communication controller 36 of the image forming device 10, as shown in FIG. 10A, causes the transmission source address "2001:DB8::1111" at the time of successful connection of communication to be stored into the address list storage part 35 in a match with the respective addresses "2001:DB8::B" and "2001:DB8::C" of the terminal device 20B and 20C, and enters information indicating "Unchecked" into the "Result of pre-check" column (step S302).

After the lapse of a certain length of time, when the transmission source address generating part 34 generates a new address "2001:DB8::2222" (step S303) and the image forming device 10 attempts communication with the terminal devices 20B and 20C with this address as the transmission source address (step S304), this communication attempt succeeds at the terminal device 20B because no access control is performed at the terminal device 20B, and a message is returned from the terminal device 20 to the image forming device 10 to the effect that the communication has been successfully connected. However, the terminal device 20C refuses this communication attempt because the transmission source address is not an authorized address (step S305).

Figure 10B:
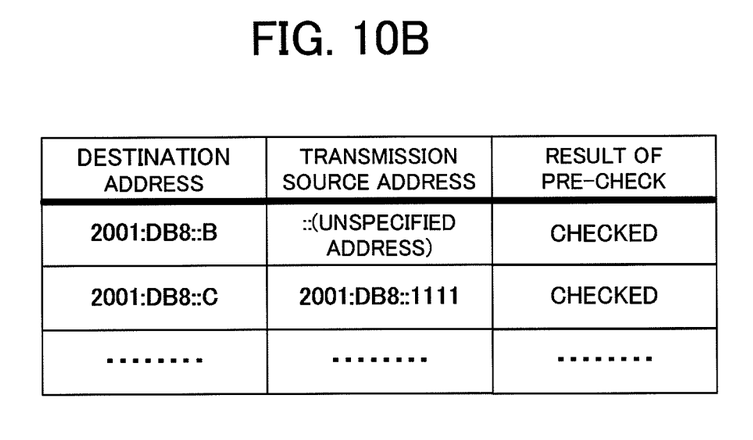

As a result, the communication controller 36 of the image forming device 10 determines that no access control is performed at the terminal device 20B as shown in FIG. 10B, and changes the transmission source address "2001:DB8::1111" registered in a match with the destination address "2001:DB8::B" in the address list to an unspecified address "::" and the entry in the "Result of pre-check" column to information indicating "Checked" (step S306).

Further, the communication controller 36 of the image forming device 10 does not change the transmission source address recorded in a match with the destination address "2001:DB8::C" in response to the refusal of the communication attempt with the terminal device 20C as shown in FIG. 10B, and instead changes the entry in the "Result of pre-check" column to information indicating "Checked" (step S307).

If in such a state an instruction to transmit data to the terminal device 20C as the destination is further given in the destination address accepting part 31 of the image forming device 10, the communication controller 36 checks the "Result of pre-check" column of the address list stored in the address list storage part 35 before attempting the instruction communication to the terminal device 20C. Since information indicating "Checked" is registered in the "Result of pre-check" column here, the communication controller 36 sets the transmission source address "2001:DB8::1111" registered in a match with the address "2001:DB8::C" of the terminal device 20C in the address list as the transmission source address (step S308).

Then, the image forming device 10 sets "2001:DB8::1111" as the transmission source address and attempts communication with the terminal device 20C (step S309). Since the transmission source address "2001:DB8::1111" is set as an authorized address at the terminal device 20C, the communication attempt succeeds, and a message is returned from the terminal device 20C to the image forming device 10 to the effect that the communication has been successfully connected.

Incidentally, the communication controller 36 in this exemplary embodiment, when the transmission source address has been changed by the transmission source address generating part 34, may as well attempt communication with an information processing device in which the "Result of pre-check" stored in the address list storage part 35 is "Unchecked" and, if the attempt succeeds, change the entry in the "Result of pre-check" column to "Checked".

[Modification]

Although the first through third exemplary embodiments are described with reference to the image forming device 10 using the temporary address function, the invention is not limited to this application, but can be applied to any information processing device, such as a facsimile device, a personal computer or a mobile telephone, which communicates with some other device designated by using the temporary address function which varies transmission source address information together with time results.

Further, while destination addresses and transmission source addresses are stored in a match with each other in the address list stored in the address list storage part 35 of the first through third exemplary embodiments, by using some other information such as the name of the device to which transmission is destined instead of destination addresses, the invention can also be realized even where the device to which transmission is destined uses the temporary address function.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a communication unit that communicates with a designated information processing device,
   a controller that, when the communication unit attempts communication with the designated information processing device and the attempt is refused by the designated information processing device, controls the communication unit so as to attempt communication with the designated information processing device by using identifying (ID) information on a transmission source used when a communication attempt with the designated information processing device was last accepted by the designated information processing device;
   a changing unit that periodically varies at least a part of the identifying information on the transmission source at regular time intervals to realize a temporary address function, each item of varied ID information identifying the information processing device; and
   a notifying unit that, if a number of pairs of ID information items on transmission source and of ID information items on destination stored in the storage unit exceeds a preset level, notifies a user of the excess.

2. The information processing device according to claim 1, further comprising:
   a storage unit that, when a communication attempt by the communication unit with the designated information processing device succeeds, stores ID information on the transmission source used when the communication attempt was last accepted by the designated information processing device in a match with the ID information on a destination of the designated information processing device,
   wherein the controller attempts again communication with the designated information processing device in accordance with the ID information on the transmission source stored in the storage unit.

3. The information processing device according to claim 2, wherein the storage unit, when the communication attempt with the designated information processing device succeeds and ID information on the transmission source matching the ID information on the destination stored in the storage unit is registered, if a communication attempt with the designated information processing device succeeds again, does not store the ID information on the transmission source used when the communication attempt with the designated information processing device was last accepted by the designated information processing device and the ID information on the destination in a match with each other.

4. The information processing device according to claim 2, further comprising:
   a second changing unit that, when the communication attempt with the designated information processing device succeeds and ID information on the transmission source matching the ID information on the destination stored in the storage unit is registered, if a communication attempt with the designated information processing device succeeds again in accordance with ID information different from the ID information on the transmission source, changes the ID information on the transmission source stored in the storage unit.

5. An information processing device comprising:
   a communication unit that communicates with a designated information processing device,
   a storage unit that, when a communication attempt with the designated information processing device succeeds, relates ID information on a transmission source used when the communication attempt was last accepted by the designated information processing device to ID information on a destination of the designated information processing device, and stores the ID information together with decision information indicating whether or not the information processing device of the destination imposes any communication restriction,
   a first changing unit that periodically varies at least a part of the ID information on the transmission source at regular time intervals to realize a temporary address function, each item of varied ID information identifying the information processing device;
   a second changing unit that changes, when communication is attempted with the designated information processing device in accordance with the ID information on the transmission source registered in a match with the ID information on the transmission source changed by the first changing unit, the communication attempt is refused by the designated information processing device and the ID information on the destination of the information processing device differs from the ID information on the transmission source used when a communication attempt was last accepted by the designated information processing device, the decision information stored in the storage unit in a match with the ID information on the destination to information indicating that it has been checked whether or not any communication restriction is imposed; and a notifying unit that, if a number of pairs of ID information items on transmission source and of ID information items on destination stored in the storage unit exceeds a preset level, notifies a user of the excess.

6. The information processing device according to claim 5, which attempts communication by using the ID information on the destination stored in a match with the decision information if the decision information indicates that it has been checked whether or not any communication restriction is imposed.

7. An information processing device comprising:
a communication unit that periodically varies at least a part of ID information on a transmission source at regular time intervals while communicating with a designated information processing device to realize a temporary address function,
a storage unit that, when a communication attempt with the designated information processing device succeeds, relates the ID information on the transmission source used when the communication attempt was last accepted by the designated information processing device to ID information on a destination of the designated information processing device, and stores the ID information together with decision information indicating whether or not the information processing device of the destination imposes any communication restriction,
a first changing unit that periodically changes at least the part of the ID information on the transmission source at regular time intervals to realize the temporary address function, each item of varied ID information identifying the information processing device;
a second changing unit that changes the decision information to information indicating that it has been checked whether or not any communication restriction is imposed when the ID information on the transmission source has been changed by the first changing unit, communication is attempted with an information processing device regarding which it has not been confirmed whether or not there is communication restriction in decision information stored in the storage unit and the attempt succeeds; and
a notifying unit that, if a number of pairs of ID information items on transmission source and of ID information items on destination stored in the storage unit exceeds a preset level, notifies a user of the excess.

8. The information processing device according to claim 7, which attempts communication by using the ID information on the destination stored in a match with the decision information if the decision information indicates that it has been checked whether or not any communication restriction is imposed.

9. An information processing system comprising:
a first information processing device that is provided with a communication unit that communicates with a designated information processing device, and a controller that, when the communication unit attempts communication with the designated information processing device and the attempt is refused by the designated information processing device, controls the communication unit so as to attempt communication with the designated information processing device by using ID information on a transmission source used when a communication attempt with the designated information processing device was last accepted by the designated information processing device;
a second information processing device provided with a unit that, when the ID information on the transmission source of communication from the first information processing device is preset ID information, imposes communication restriction on acceptance of the communication;
a transmission source address generating unit that periodically varies at least a part of the ID information on the transmission source at regular time intervals to realize a temporary address function, each item of varied ID information identifying the first information processing device; and
a notifying unit that, if a number of pairs of ID information items on transmission source and of ID information items on destination stored in the storage unit exceeds a preset level, notifies a user of the excess.

10. An information processing method comprising:
attempting communication, by a first information processing device, with a designated information processing device, and
attempting, if the communication with the designated information processing device is refused by the designated information processing device, communication with the designated information processing device by using ID information on a transmission source used when a communication attempt with the designated information processing device was last accepted by the designated information processing device,
wherein at least a part of the ID information on the transmission source is periodically varied at regular time intervals to realize a temporary address function, each item of varied ID information identifying the first information processing device, and
if a number of pairs of ID information items on transmission source and of ID information items on destination stored in the storage unit exceeds a preset level, notifying a user of the excess.

11. A non-transitory computer readable medium storing a program for causing a computer to execute a process comprising:
attempting communication, by a first information processing device, with a designated information processing device, and
attempting, if the communication with the designated information processing device is refused by the designated information processing device, communication with the designated information processing device by using ID information on a transmission source used when a communication attempt with the designated information processing device was last accepted by the designated information processing device,
wherein at least a part of the ID information on the transmission source is periodically varied at regular time intervals to realize a temporary address function, each item of varied ID information identifying the first information processing device, and
if a number of pairs of ID information items on transmission source and of ID information items on destination stored in the storage unit exceeds a preset level, notifying a user of the excess.

* * * * *